Sept. 2, 1947.  H. W. GOFF  2,426,606
AUTOMATIC FOLLOW-UP FOR MOTOR OF SELF-SYNCHRONOUS TYPE
Filed Nov. 27, 1945
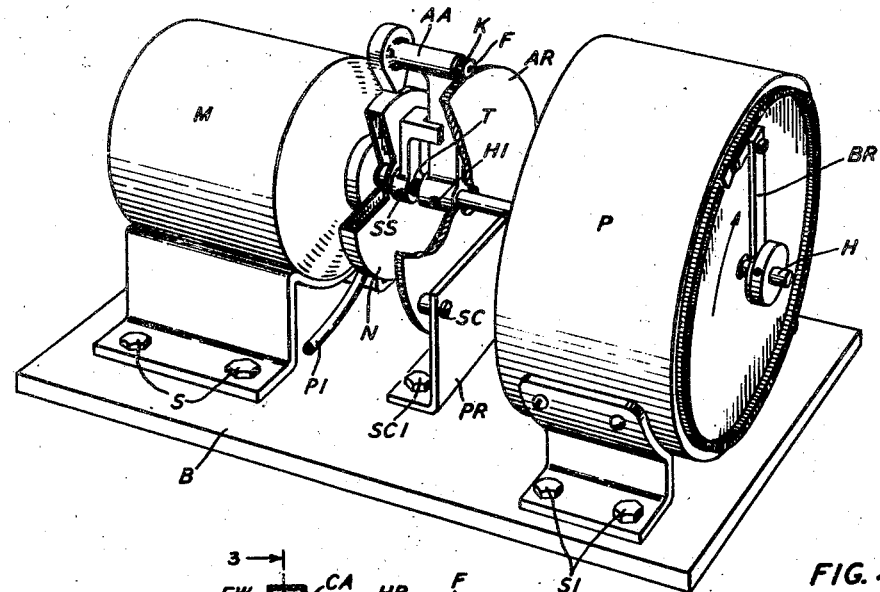
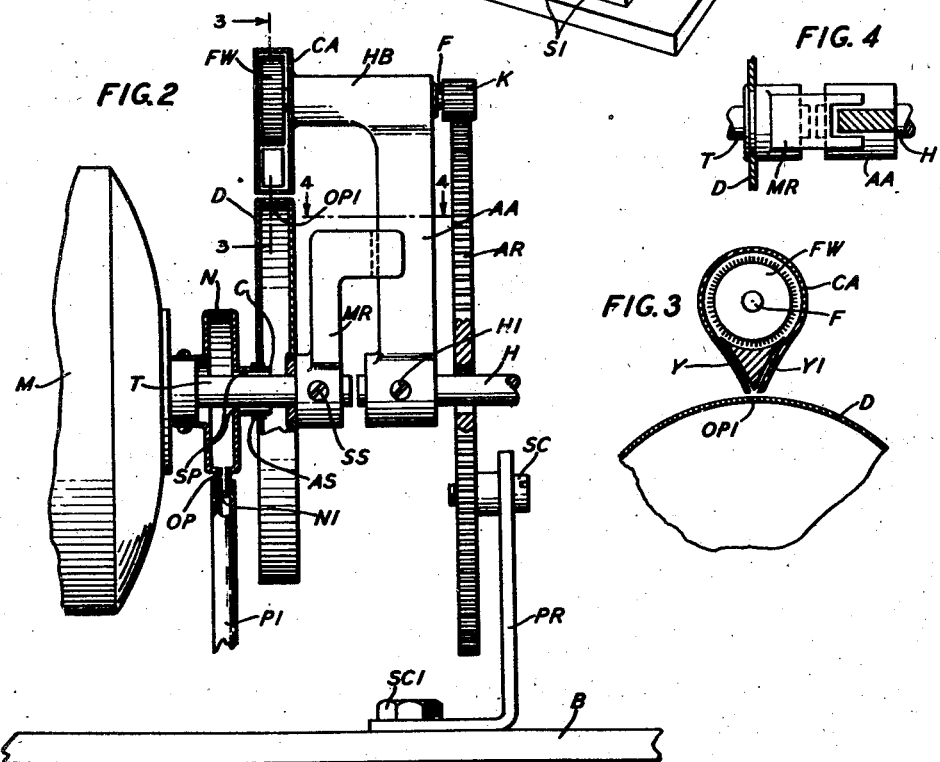
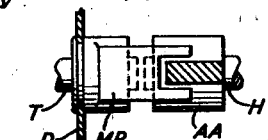
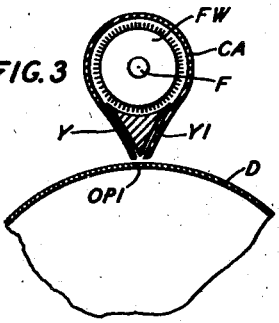
INVENTOR
H. W. GOFF
BY J. MacDonald
ATTORNEY Patented Sept. 2, 1947

2,426,606

UNITED STATES PATENT OFFICE 2,426,606

AUTOMATIC FOLLOW-UP FOR MOTOR OF SELF-SYNCHRONOUS TYPE

Harold W. Goff, Manhasset, N. Y., assignor to Bell Telephone Laboratories, Incorporated, New York, N. Y., a corporation of New York Application November 27, 1945, Serial No. 631,163

7 Claims. (Cl. 60—57)

1

This invention relates to means for maintaining a driven element in angular relation with electric motors of the self-synchronous type, generally known as "Selsyns."

In self-synchronous generators and motors as it is well known, the torque which holds the two armatures in synchronism is so low at the perfect coupling angle that the receiving motor cannot satisfactorily be used to drive other apparatus directly for the reason that it is subject to considerable oscillations before coming to rest due to the load and to the inertia of the apparatus actuated thereby.

The object of the present invention is the provision of a turbine which is actuated by a source of compressed air and controlled by means carried by a receiving Selsyn motor for actuating a driven apparatus in synchronism with the angular movement of a generator and that of the receiving motor.

In the drawing:

Fig. 1 is a perspective view showing a receiving Selsyn motor combined with an air turbine for operating a potentiometer in synchronism with the motor and with a generator operatively connected to the receiving Selsyn motor, a number of operating parts being shown with portions broken away;

Fig. 2 is a front elevation view shown with a number of operating parts with portions in vertical section;

Fig. 3 is a partial view of the air turbine shown in Fig. 1 with the casing of the turbine in vertical section taken on line 3—3 of Fig. 2; and Fig. 4 is a partial view shown in section taken on line 4—4 of Fig. 2 showing the coupling between the motor armature shaft and the supporting arms for the air turbine carried by the potentiometer shaft.

A receiving Selsyn or motor M as shown in Fig. 1 is securely mounted on one end of a rectangularly shaped base B as by a number of screws S while to the opposite end of the base B is mounted a potentiometer P, for example, held securely on the base by a plurality of screws SI. The operating shaft H of the potentiometer is disposed in coaxial relation and in juxtaposition to the armature shaft T of motor M as best seen in Figs. 1 and 2.

To the casing of motor M is secured as by a number of screws R, a drum-shaped member N having a radially disposed tubing OP for connection with an air inlet pipe PI, the latter connecting with a source of compressed air, not shown. The drum N is provided with a collar portion C to which is fitted an air seal AS secured to the edge of an opening in a disc forming the wall of a drum D, best seen in Fig. 2. The collar C in cooperation with the armature shaft T of motor M forms an annular air space SP leading into the

2 drum D. This drum is secured to the hub of an arm MR itself secured to the armature shaft T as by a set screw SS. The arm MR, as best seen in Fig. 4, terminates at its free end in the form of a fork disposed in engagement with an arm AA secured on the potentiometer shaft as by a set screw HI, the width between the prongs of arm MR relative to the thickness of arm AA being such as to permit a predetermined angular motion of the two arms relative to each other for a purpose which will be hereinafter described in detail.

The arm AA is provided at its free end with a hub HB serving as bearing for a shaft F having a pinion K keyed at one end thereof while on the opposite end of shaft F is keyed a vane wheel FW housed in a casing carried at one end portion of hub HB. This casing as shown in Fig. 3 is provied with two air passages Y and YI converging towards each other at the periphery of drum D from points substantially tangent to the diameter of vane wheel FW. The air passages Y and YI at their meeting point are disposed for registry with an air opening OPI at the periphery of drum D as controlled by the relative movement of the arms MR and AA under conditions that will be hereinafter described in detail.

The pinion K meshes with a gear AR disposed concentric relative to potentiometer shaft H and is secured against rotation on a support PR by a number of screws SC, the support being in turn secured to the base B by a number of screws SCI.

The operation of the mechanism of this invention under control of motor M so as to position the brush BR of the potentimeter P in angular adjustment relative to a Selsyn generator shaft is as follows: The operation of the receiving Selsyn motor M is effective to rotate the arm MR and thereby the arm AA. The compressed air from the inlet pipe PI enters the drum D and passes through the annular air space SP between the armature shaft T and the collar C of drum N from which the air reaches the drum D secured to the arm MR keyed to the armature shaft T, to escape through the opening OPI at the periphery of this drum to flow through one of the air paths Y and YI as the case may be depending upon the angular difference ± between the Selsyn motor and the potentiometer brush BR for rotating the vane wheel either clockwise or counter-clockwise and thereby the pinion K meshing with the stationary gear AR, thus causing a corrective angular movement to the arm AA relative to the opening OPI irrespective of the torque required for the operation of the potentiometer brush BR of the potentiometer provided, of course, that the torque value for operating this potentiometer brush does not exceed the torque obtained by the operation of the vane wheel FW.

In accordance with this invention since the vane wheel FW furnishes the motive power, the motor M remains in perfect angular relation to the shaft of the transmitting Selsyn while making possible the operation of apparatus requiring a much greater torque than that obtained by the power generated by the transmitting Selsyn.

What is claimed is:

1. In a mechanism for positioning a driven shaft in angular relation to the armature shaft of a receiving Selsyn, said mechanism comprising a hollow member mounted on said armature shaft forming an air path, a support keyed on said driven shaft, an air turbine carried by said support having two air paths disposed for alternately registering with the air path formed by said hollow member for actuating said turbine in either of two directions, and means actuated by said turbine for placing said driven shaft in adjusted angular position relative to the armature shaft of said receiving Selsyn in said directions.

2. In a mechanism for positioning a driven element in angular relation to the movable element of a receiving Selsyn, said mechanism comprising a hollow member carried by the armature shaft of said receiving Selsyn forming an air path, an arm-shaped support carried by said driven element, an air turbine mounted on said support having two inlet air paths disposed for alternate communication with the air path formed by said hollow member for rotating said turbine in either of two directions depending upon the registering relation of the air path formed by said hollow member relative to the air paths of said turbine for positioning said driven element in angular relation to said hollow member.

3. In a mechanism for positioning a driven element in angular relation to the armature shaft of a receiving Selsyn, said mechanism comprising a stationary drum having an air inlet and an air outlet, another drum mounted on the armature shaft of said receiving Selsyn having an air path at its periphery, a vane wheel, a casing for housing said wheel having two air paths disposed tangent and diametrically opposite to said wheel and converging in position adjacent to the air path in the second-mentioned drum, a support for said casing and said vane wheel, a pinion actuated by said vane wheel, a stationary gear meshing with said pinion to cause the rotation of said support upon the rotation of said vane wheel for actuating said driven element upon the registry of one of said converging air paths with the air path at the periphery of said drum.

4. In a mechanism for maintaining the operation of a driven shaft in synchronism with the rotation of a controlling shaft, said mechanism comprising means carried by said controlling shaft forming an air path, an air turbine carried by said driven shaft, means in said air turbine forming two air paths for alternate connection with the air path formed by the means carried by said controlling shaft and leading to points diametrically opposite to the motive wheel of said turbine to cause the rotation of said wheel in opposite directions upon an angular difference in the phase relation of said controlling shaft relative to said driven shaft and a gearing mechanism actuated by the operation of said turbine to cause the planetary movement thereof for moving said driven shaft in synchronism with said controlling shaft.

5. In a mechanism for positioning the shaft of a driven element in angular relation to the armature shaft of a receiving Selsyn, said mechanism comprising an arm secured to the armature shaft of said receiving Selsyn, an arm secured to the shaft of the driven element, means carried by one of said arms for engaging the other arm but permitting relative movement of said arms relative to each other within a predetermined limit, an air turbine carried by one of said arms having two diametrically opposite air paths converging towards each other, means carried by the armature shaft of said receiving Selsyn having an air path leading to either one of said air paths in said turbine for actuating the latter depending upon the position of said arms relative to each other within said limit, and a gearing mechanism actuated by said turbine for positioning the shaft of said driven element in adjusted angular position relative to said receiving Selsyn.

6. In a follow-up mechanism for positioning the shaft of a driven element in angular relation to the armature shaft of a receiving Selsyn, said mechanism comprising an arm secured to the armature shaft of said receiving Selsyn, another arm secured to the shaft of the driven element and operatively engaging the first-mentioned shaft but capable of angular movement relative to each other within a predetermined limit, a drum secured on the armature shaft of said receiving Selsyn having an air path at its periphery, a casing carried by the arm secured to the shaft of the driven element having air paths disposed for alternately registering with the air path in said drum depending upon the relative movement of said arm with said driven element, a vane wheel mounted for rotation on the arm secured to said driven element for rotation in opposite directions depending upon the position of said air paths in said casing relative to the air path in said drum, a shaft for said vane wheel having a pinion keyed thereon, a stationary gear engaged by said pinion to cause the rotation of the arm mounted on said driven element in phase with said drum and an air pressure source for actuating said vane wheel.

7. In a follow-up mechanism for positioning a driven element in angular relation to the movable element of a receiving Selsyn, said mechanism comprising an air turbine having diametrically disposed air paths, a support for said turbine carried by said driven element, an arm carried by said movable element having means for engaging said support but capable of movement relative thereto within a predetermined angular distance, a drum carried by the armature shaft of said receiving Selsyn having an air opening at the periphery thereof disposed to register with either one of said air paths depending upon the angular position of said turbine support and said arm for actuating said turbine, and a gearing mechanism actuated by said turbine to cause the operation of said support relative to said arm for positioning said driven element in angular adjustment relative to the movable element of said receiving Selsyn.

HAROLD W. GOFF.